(12) United States Patent
Kinugasa

(10) Patent No.: US 11,230,009 B2
(45) Date of Patent: Jan. 25, 2022

(54) ROBOT CONTROL METHOD AND ROBOT

(71) Applicant: Panasonic Intellectual Property Management Co., Ltd., Osaka (JP)

(72) Inventor: Yasuhiro Kinugasa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 267 days.

(21) Appl. No.: 16/517,741

(22) Filed: Jul. 22, 2019

(65) Prior Publication Data

US 2019/0337156 A1 Nov. 7, 2019

Related U.S. Application Data

(63) Continuation of application No. PCT/JP2018/004357, filed on Feb. 8, 2018.

(30) Foreign Application Priority Data

Feb. 13, 2017 (JP) .............................. JP2017-023748

(51) Int. Cl.
*B25J 9/16* (2006.01)
(52) U.S. Cl.
CPC ........... *B25J 9/1676* (2013.01); *B25J 9/1674* (2013.01)
(58) Field of Classification Search
CPC ........ B25J 9/1676; B25J 9/1674; B25J 19/06; G05B 2219/40311; G05B 2219/40317;
(Continued)

(56) References Cited

U.S. PATENT DOCUMENTS

| | | | | |
|---|---|---|---|---|
| 4,613,943 A | * | 9/1986 | Miyake | B23K 9/12 318/568.2 |
| 2003/0208302 A1 | * | 11/2003 | Lemelson | G05B 19/19 700/245 |
| 2008/0051938 A1 | * | 2/2008 | Bhatt | G05B 19/056 700/251 |

(Continued)

FOREIGN PATENT DOCUMENTS

| | | |
|---|---|---|
| EP | 2 230 054 | 9/2010 |
| JP | 3-037701 | 2/1991 |

(Continued)

OTHER PUBLICATIONS

Jason L. McKesson, "Learning Modern 3D Graphics Programming", 2012, https://paroj.github.io/gltut/index.html (Year: 2012).*

(Continued)

*Primary Examiner* — Abby Y Lin
*Assistant Examiner* — Danielle Marie Jackson
(74) *Attorney, Agent, or Firm* — Wenderoth, Lind & Ponack, L.L.P.

(57) ABSTRACT

A robot control method includes defining a robot monitor model that covers at least a part of the robot and defining a monitor region parallel to a coordinate system for the robot. The monitor region is configured to monitor a range of motion of the robot. The method further includes transforming a position of a definition point that is an arbitrary point contained in the robot monitor model into a position of the definition point in a coordinate system different from the coordinate system for the robot (ST9), determining whether or not the robot monitor model is put into contact with a boundary surface of the monitor region by using the transformed position of the definition point (ST6), and stopping motion of the robot if the robot monitor model is put into contact with the boundary surface (ST8).

2 Claims, 7 Drawing Sheets

(58) Field of Classification Search
CPC .......... G05B 2219/49142; G05B 2219/40492; G05B 2219/49137; G05B 2219/40202
See application file for complete search history.

(56) References Cited

U.S. PATENT DOCUMENTS

| | | | | |
|---|---|---|---|---|
| 2010/0324769 | A1* | 12/2010 | Takaoka | G05D 1/024 701/25 |
| 2015/0231785 | A1 | 8/2015 | Suga | |
| 2016/0075025 | A1 | 3/2016 | Maeda | |
| 2016/0151915 | A1* | 6/2016 | Nishi | B25J 9/1692 700/247 |

FOREIGN PATENT DOCUMENTS

| | | |
|---|---|---|
| JP | 6-246663 | 9/1994 |
| JP | 2016-013607 | 1/2016 |
| JP | 2016-059980 | 4/2016 |
| KR | 20140015802 | 2/2014 |

OTHER PUBLICATIONS

Extended European Search Report dated Apr. 9, 2020 in related European Patent Application No. 18752067.1.
International Search Report of PCT application No. PCT/JP2018/004357 dated Apr. 10, 2018.
Seung-Min Baek et al: "Systems and algorithms for development of the robot safety function", Ubiquitous Robots and Ambient Intelligence (URAI), 2012 9th International Conference on, IEEE, Nov. 26, 2012 (Nov. 26, 2012), pp. 471-475, XP032331074.
The European Search Report dated Jun. 5, 2020 in related European Patent Application No. 18752067.1.

\* cited by examiner

35

36

ROBOT CONTROL METHOD AND ROBOT

This application is a continuation of the PCT International Application No. PCT/JP2018/004357 filed on Feb. 8, 2018, which claims the benefit of foreign priority of Japanese patent application No. 2017-023748 filed on Feb. 13, 2017, the contents all of which are incorporated herein by reference.

TECHNICAL FIELD

The present invention relates to a method for defining a region used to monitor motion of a robot. The invention also relates to a robot using the method.

BACKGROUND ART

In production systems using robots, the robot and a human frequently work together. An example situation is that one welding robot is welding two objects alternately and while the welding robot is welding one of the objects, a human is replacing the other object with another object.

In such working, a safety step is taken to prevent the robot from erroneously entering into a region where the human works. The safety step, as shown in FIG. 11, involves defining three-dimensional spherical or capsule-shaped model 200 (hereinafter referred to as "robot monitor model 200") to cover robot 100 and incidental equipment, and defining safe region 300 where the robot can move and unsafe region 400 where the robot cannot move. Then, a system monitors a position of robot monitor model 200 in a space, and when robot monitor model 200 is about to enter into the unsafe region, the system stops the motion of the robot.

These regions are defined using a controller for operating the robot. For example, PTL 1 discloses a technique for readily defining a safe region. This technique enables a user to define a safe region by drag control instead of a direct input of numerical values. The safe region can be shifted, enlarged, and scaled down by drag control.

CITATION LIST

Patent Literature

PTL 1: Unexamined Japanese Patent Publication No. 2016-59980

SUMMARY OF THE INVENTION

Unfortunately, the technique of PTL 1 is based on a premise that an x-axis, a y-axis, and a z-axis of a coordinate system for the robot are parallel to an x-axis, a y-axis, and a z-axis of a user facility, respectively, and then a safe region is defined so as to include an entire range of motion of the robot. Thus, even if the x-axis, the y-axis, and the z-axis of the robot coordinate system are not parallel to the x-axis, the y-axis, and the z-axis of the user facility, a safe region is defined so as to include the entire range of motion of the robot. This inevitably results in an enlarged safe region such that the safe region includes an excessive unsafe region that is essentially unnecessary, reducing a ratio of a region where the robot can move.

It is an object of the present invention to provide a robot control method that enables a user to define a monitor region suitable for a facility of the user.

According to the present invention, accomplished to solve the problem described above, a method for controlling a robot includes defining a robot monitor model that covers at least a part of the robot and defining a monitor region parallel to a coordinate system for the robot. The monitor region is configured to monitor a range of motion of the robot. The method further includes transforming a position of a definition point that is an arbitrary point contained in the robot monitor model into a position of the definition point in a coordinate system different from the coordinate system for the robot, determining whether or not the robot monitor model is put into contact with a boundary surface of the monitor region by using the transformed position of the definition point, and stopping motion of the robot if the robot monitor model is put into contact with the boundary surface.

The robot control method according to the present invention includes the steps described above and hence enables a user to define a monitor region suitable for a facility of the user.

DESCRIPTION OF EMBODIMENT

An exemplary embodiment of the present invention will now be described with reference to the drawings.

Figure 1:
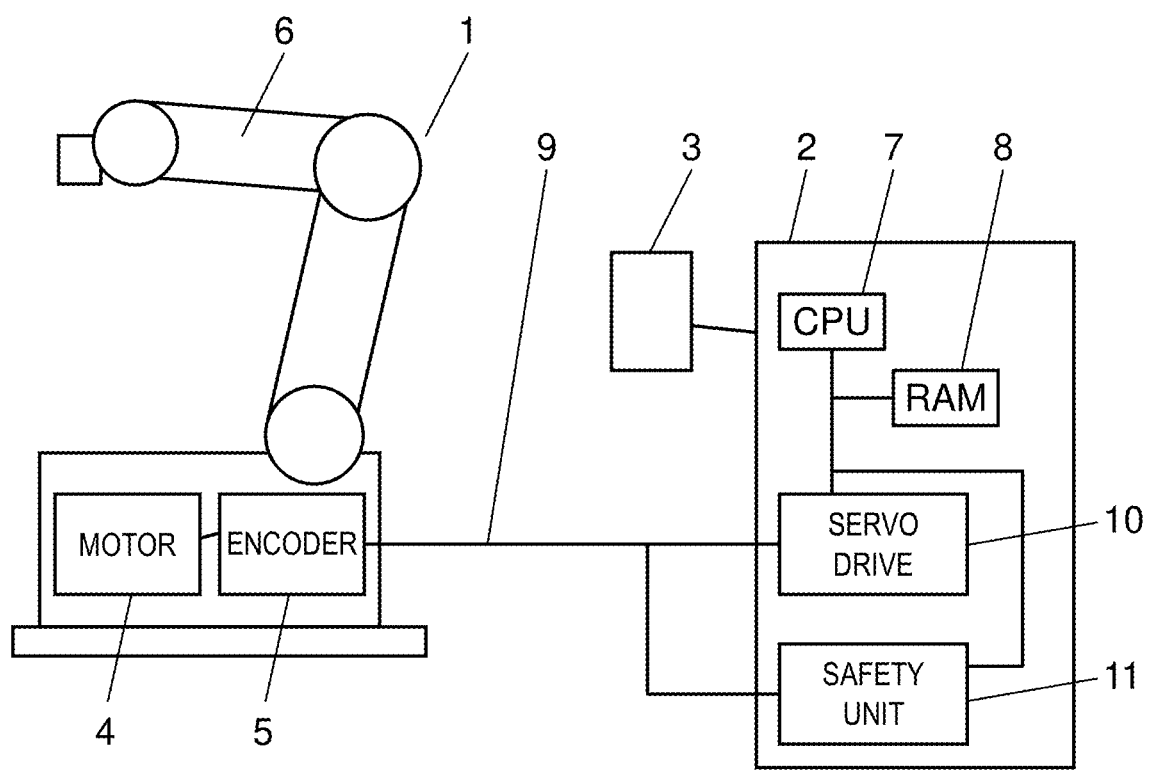
FIG. 1 is a schematic view showing a configuration of a robot according to an exemplary embodiment of the present invention.

FIG. 1 is a schematic view showing a configuration of a robot according to the present exemplary embodiment. The robot includes robot body 1 equipped with six-axis articulated robot arm 6, control device 2 to control motion of robot arm 6, and connection cable 9 to connect robot body 1 with control device 2. Operation device 3 with a display is designed to communicate with control device 2 and thus enables a user to set the motion of robot arm 6 and control motion and others.

Robot body 1 includes a plurality of motors 4 to move robot arm 6 and a plurality of encoders 5 to detect rotation amounts of respective motors 4. Robot body 1 feeds information about positions of motors 4 back to control device 2.

Control device 2 includes central processing unit (CPU) 7 designed to control control device 2 and random-access memory (RAM) 8 that is both readable and writable. RAM 8 stores instruction programs for the robot, function settings for the robot, and other data entered by an operator of the robot with operation device 3. RAM 8 can also store position commands sent to robot body 1 and other instructions. Control device 2 further includes servo drive 10 and safety unit 11. CPU 7 sends operating commands to servo drive 10 so that servo drive 10 controls motors 4. In response to information from encoders 5 and operating commands from CPU 7, safety unit 11 determines whether or not encoders 5 are faulty.

A method for controlling a robot by control device 2 will now be described. A robot control method according to this exemplary embodiment is a method using a robot monitor model and a monitor region to ensure robot safety. Specifically, in this exemplary embodiment, the robot is controlled such that robot body 1 moves within a monitor region. In other words, when robot body 1 goes out of the monitor region, the control device stops the motion of robot body 1.

Figure 2:
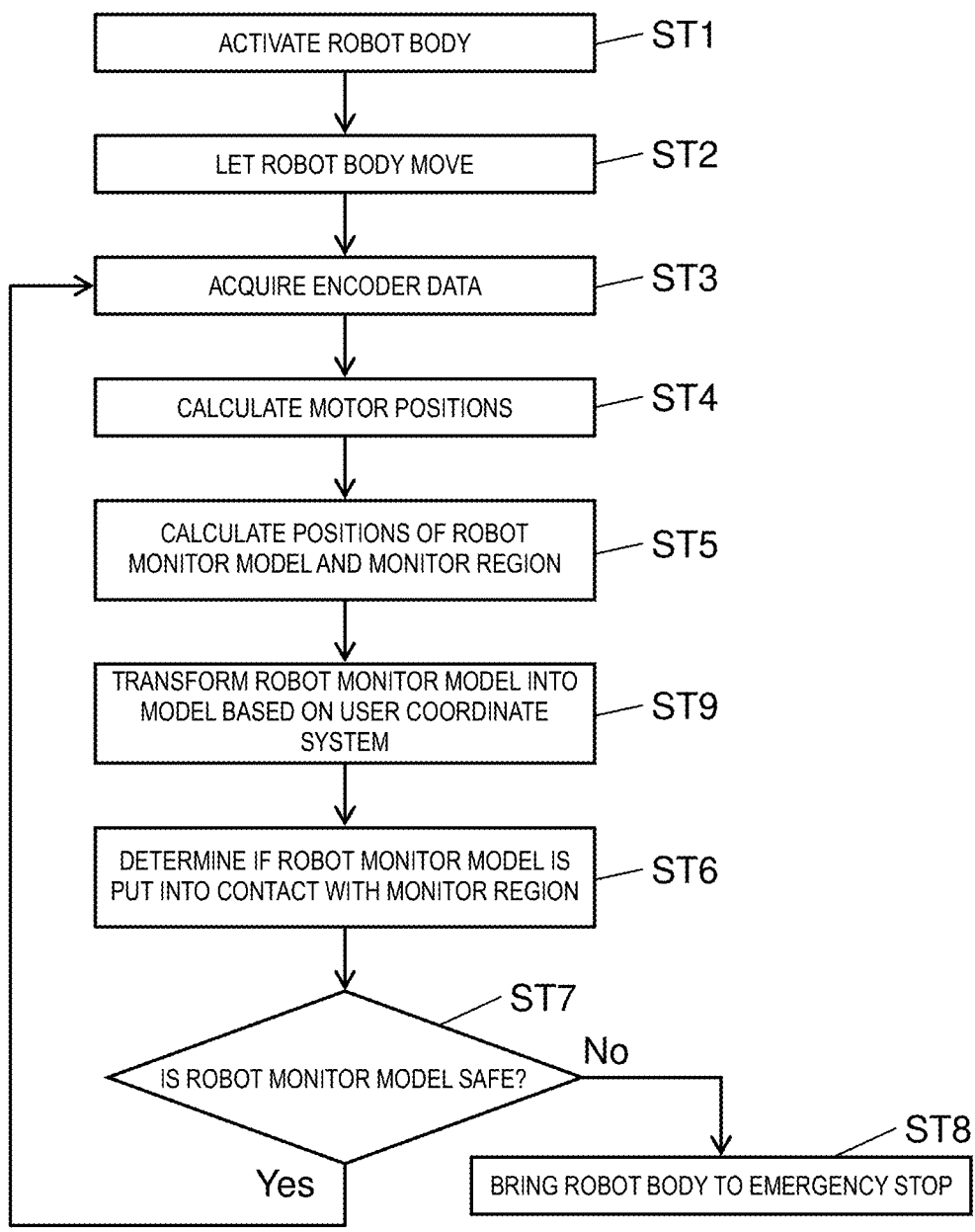
FIG. 2 is a flowchart showing a method for controlling a robot according to the exemplary embodiment of the present invention.

FIG. 2 is a flowchart showing the method of controlling the robot. In this exemplary embodiment, control device 2 activates robot body 1. After that, when safety unit 11 determines contact between the robot monitor model and the monitor region, the control device stops robot body 1.

First, in step ST1, control device 2 activates robot body 1. In step ST2, control device 2 lets robot body 1 move (shift, stop, etc.), and a procedure proceeds to step ST3.

Subsequent steps ST3 to ST9 are a process that is periodically performed by safety unit 11.

In step ST3, safety unit 11 acquires encoder data from encoders 5. In step ST4, safety unit 11 calculates angles of motors 4 from acquired encoder data, reduction ratios of motors 4 on respective axes, and information on motor origin points, and also calculates positions of motors 4 from the angles of motors 4.

In step ST5, safety unit 11 calculates positions of the robot monitor model and the monitor region in a coordinate system for the robot (hereinafter referred to as a "robot coordinate system"), based on the positions of the motors calculated in step ST4.

A way of calculating positions of the robot monitor model and the monitor region will now be described in detail.

Figure 3A:
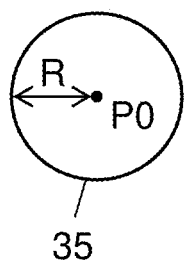
FIG. 3A is a drawing illustrating a spherical model according to the exemplary embodiment of the present invention.
Figure 3B:
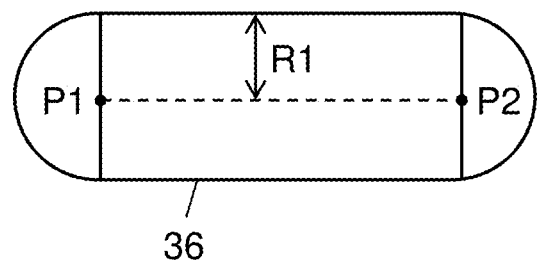
FIG. 3B is a drawing illustrating a capsule model according to the exemplary embodiment of the present invention.

The robot monitor model includes a plurality of three-dimensional spherical models (hereinafter referred to as "spherical models") and three-dimensional capsule-shaped models (hereinafter referred to as "capsule models") that are combined together so as to cover robot body 1. The robot monitor model here is a three-dimensional outer covering made up of spherical models and capsule models combined together. As shown in FIG. 3A, spherical model 35 is defined by center position P0 and radius R of a sphere. As shown in FIG. 3B, capsule model 36 is defined by two definition points P1 and P2, and radius R1 of a capsule.

Figure 4:
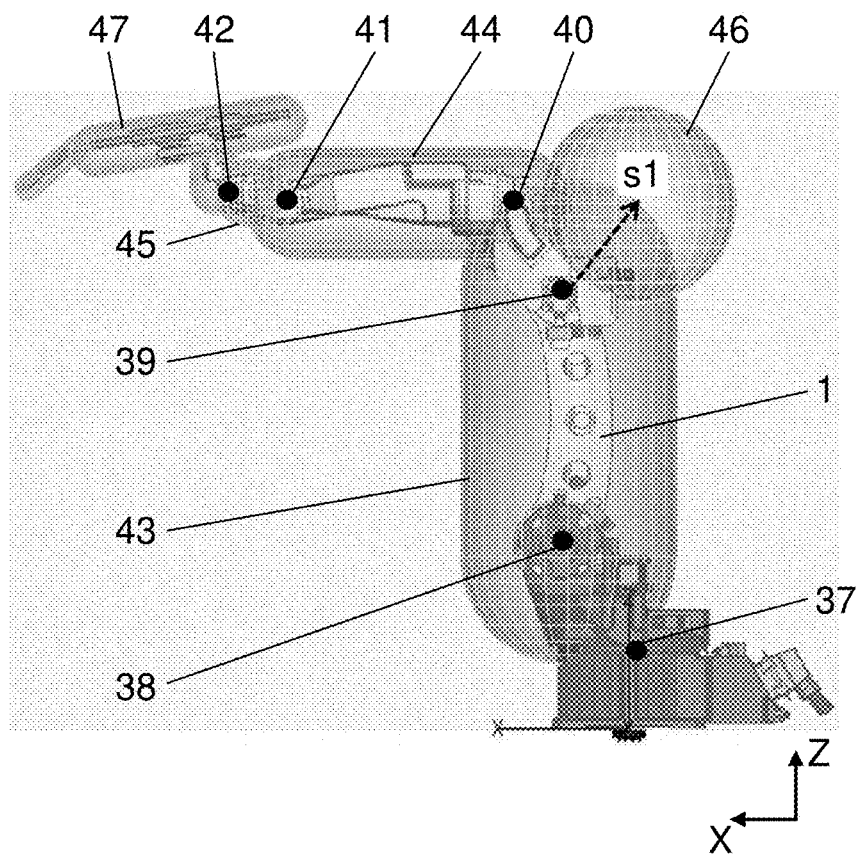
FIG. 4 is a drawing illustrating a robot monitor model according to the exemplary embodiment of the present invention.

FIG. 4 shows a robot monitor model made up of a plurality of three-dimensional models. Robot body 1 has articulations on six axes. Motors 4 are disposed at first axis position 37, second axis position 38, third axis position 39, fourth axis position 40, fifth axis position 41, and sixth axis position 42, respectively. The robot monitor model is made up of capsule model 43, capsule model 44, capsule model 45, incidental equipment model 46, and tool model 47 so as to cover robot body 1.

Capsule model 43 covers second and third axis positions 38 and 39 and has radius r1. Capsule model 44 covers fourth and fifth axis positions 40 and 41 and has radius r2. Capsule model 45 covers fifth and sixth axis positions 41 and 42 and has radius r3. Incidental equipment model 46 is a spherical model that is used to cover incidental equipment and has radius r4. A center position of the spherical model is shifted from the third axis position by an amount of s1. Tool model 47 includes a plurality of capsule models and spherical models combined together.

In calculation of the position of the robot monitor model in step ST5 in FIG. 2, the safety unit first calculates three-dimensional positions of the motors in the robot coordinate system from a length of robot arm 6 and the angles of the axes calculated in step ST4.

Next, the safety unit sets second and third axis positions 38 and 39 as definition points for capsule model 43 and sets radius r1. Similarly, the safety unit sets fourth and fifth axis positions 40 and 41 as definition points for capsule model 44 and sets radius r2. Similarly, the safety unit sets fifth and sixth axis positions 41 and 42 as definition points for capsule model 45 and sets radius r3. The safety unit sets the center position of incidental equipment model 46 at a place that is shifted from third axis position 39 by an amount of s1 and sets radius r4. The safety unit sets definition points and radii for the spherical models and the capsule models of tool model 47 with respect to sixth axis position 42.

Values such as r1 to r4 and s1 of models 43 to 47 are set at standard values in advance of the start of this control procedure. The user can, however, change any of the values using operation device 3.

Figure 5:
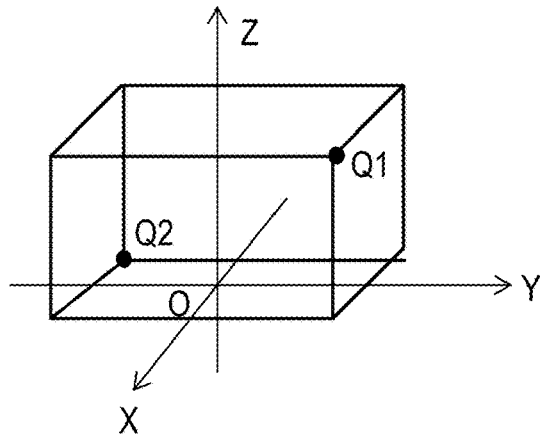
FIG. 5 is a drawing illustrating a monitor region according to the exemplary embodiment of the present invention.

FIG. 5 is a drawing illustrating a monitor region. The monitor region is a rectangular parallelepiped defined by definition points Q1, Q2 on a diagonal line. The user sets these two points before the start of this control procedure by entering x, y, and z coordinates of two points Q1, Q2 in the robot coordinate system through operation device 3. In this example, (the z coordinate of Q2)<(the z coordinate of Q1). In step ST5, the safety unit calculates the position of the monitor region using the set values.

In the flowchart of FIG. 2, after step ST5, the procedure proceeds to step ST9 to transform the robot monitor model into a model based on a user coordinate system, and then proceeds to step ST6. However, in this example, step ST6 and subsequent steps will be described before a description of step ST9 for the sake of convenience.

In step ST6, the safety unit determines if the robot monitor model is put into contact with the monitor region that is defined parallel to the robot coordinate system. In this description, a state in which the robot coordinate system and the monitor region are parallel means that an x-axis, a y-axis, and a z-axis of the robot coordinate system are parallel to an x-axis, a y-axis, and a z-axis of a user facility, respectively. Thus, the "monitor region that is defined parallel to the robot coordinate system" is a monitor region in a state in which the x-axis of the monitor region is parallel to the x-axis of the robot coordinate system, the y-axis of the monitor region is parallel to the y-axis of the robot coordinate system, and the z-axis of the monitor region is parallel to the z-axis of the robot coordinate system.

Figure 6A:
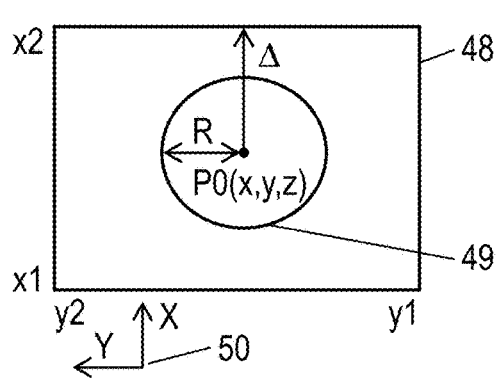
FIG. 6A is a drawing for illustrating contact between a robot monitor model and a monitor region according to the exemplary embodiment of the present invention.

A way of determining contact will now be described with a spherical model taken as an example. FIG. 6A is a drawing viewed from a positive side of a z-axis of robot coordinate system 50. This example shows a pattern in which spherical model 49, a robot monitor model, exists within monitor region 48. Spherical model 49 has radius R and center coordinates P0 (x, y, z).

In a similar way to FIG. 5, this monitor region 48 is defined by definition points Q1 (x1, y1, z1) and Q2 (x2, y2, z2). An inside of monitor region 48 is set as a safe region. In other words, robot body 1 is permitted to freely move within monitor region 48.

If spherical model 49 is within monitor region 48, as illustrated in FIG. 6A, center coordinates P0 of spherical model 49 satisfy the following relationships.

$$x1+R<x<x2-R \quad \text{(relationship 1)}$$

$$y1+R<y<y2-R \quad \text{(relationship 2)}$$

$$z1+R<z<z2-R \quad \text{(relationship 3)}$$

Figure 6B:
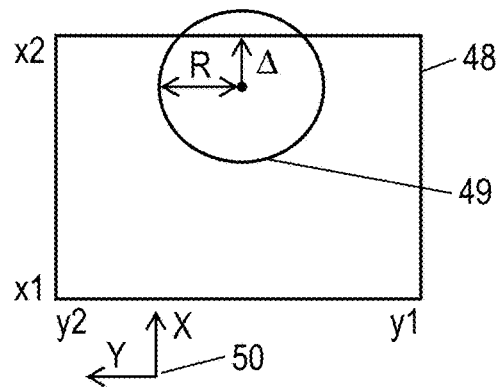
FIG. 6B is a drawing for illustrating contact between a robot monitor model and a monitor region according to the exemplary embodiment of the present invention.

If the three conditions are satisfied, spherical model 49 exists within monitor region 48. FIG. 6B shows a pattern in which spherical model 49 is partly outside monitor region 48. This case illustrates that x<x2−R, the right side of (relationship 1), is not satisfied.

In this way, in step ST6, the safety unit determines contact between the robot monitor model and the monitor region based on the definition points and the radii of the robot monitor model and the definition points of the monitor region, which have been set in step ST5. If the three conditions described above are not satisfied, i.e. spherical model 49 is in contact with a boundary surface of monitor region 48, or at least a part of spherical model 49 is outside monitor region 48, the safety unit determines that the robot monitor model is unsafe.

A basic approach to the capsule model is the same as that to the spherical model. Safety unit 11 determines safe or unsafe based on a distance between a capsule model and a monitor region.

Next, in step ST7, based on the result of determining contact between the robot monitor model and the monitor region, if the safety unit determines that a relationship between the robot monitor model and the monitor region is safe, the procedure returns to step ST3. If the safety unit determines that the relationship between the robot monitor model and the monitor region is unsafe, the procedure proceeds to step ST8 and the safety unit stops the motion of robot body 1 by bringing robot body 1 to an emergency stop.

In the control procedure described above, the safety unit determines safe or unsafe using only the robot coordinate system and controls the robot based on that result. This is a control method implemented in general. The present exemplary embodiment has additional step ST9 between step ST5 and step ST6.

In this step ST9, the safety unit performs a calculation to transform the robot monitor model into a model based on a coordinate system specified by the user. This transformation performed in step ST9 will be described in detail.

Figure 7:
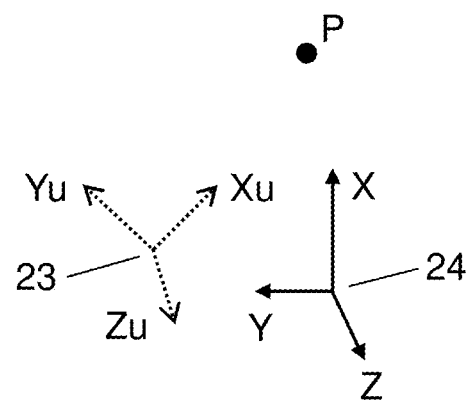
FIG. 7 is a drawing illustrating a coordinate system for a robot and a user coordinate system according to the exemplary embodiment of the present invention.

FIG. 7 shows robot coordinate system 24 and user coordinate system 23 that is freely specified by the user. Definition point P of a robot monitor model is a position that is identical both when viewed in user coordinate system 23 and when viewed in robot coordinate system 24. Thus, a relationship in (equation 4) is satisfied.

[Math 1]

$$^{r}P = {^{r}T_{u}} \cdot {^{u}P} \quad \text{(equation 4)}$$

where;
$^{r}P$: a position of point P viewed in the robot coordinate system
$^{r}T_{u}$: a homogeneous transformation matrix used to transform a position in the robot coordinate system into a position in the user coordinate system
$^{u}P$: a position of point P viewed in the user coordinate system By modifying this equation, (equation 5) is derived. A positional relationship for the robot monitor model in user coordinate system 23 is represented by (equation 5).

[Math 2]

$$^{u}P = {^{r}T_{u}^{-1}} \cdot {^{r}P} \quad \text{(equation 5)}$$

where;
$^{r}T_{u}^{-1}$: an inverse of the homogeneous transformation matrix used to transform a position in the robot coordinate system into a position in the user coordinate system In step ST9, the safety unit performs a calculation of (equation 5) to transform the position of the robot monitor model calculated in step ST5 into a position of the robot monitor model viewed in the user coordinate system. Then, in step ST6, the safety unit determines if the transformed robot monitor model is put into contact with the monitor region.

In this way, user coordinate system 23 unrelated to robot coordinate system 24 is established, and the safety unit enables the monitor region to move in parallel or rotationally in accordance with user coordinate system 23 such that an optimum monitor region is defined. Thus, the control device can make an optimum setting without excessively limiting a range of motion of the robot.

In the example described above, the robot monitor model is transformed into a model based on the user coordinate system. Conceivably, a monitor region may be transformed into a region based on a user coordinate system, for example. However, this case necessitates changing a conventional calculation process performed in step ST6 and hence has a substantial influence on an existing process.

Figure 8A:
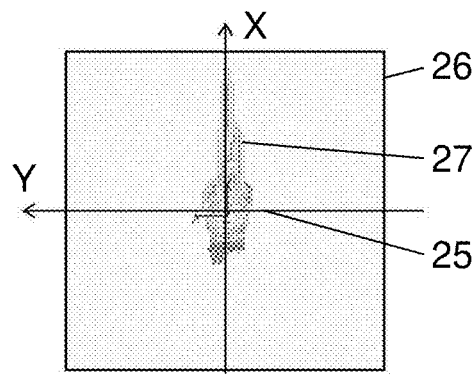
FIG. 8A is a drawing illustrating a relationship between a robot monitor model and a monitor region.

A description will be given of a case in which the monitor region is transformed into a region based on a user coordinate system. FIG. 8A is a drawing showing monitor region 26 and robot monitor model 27 viewed from a positive side of a z-axis of robot coordinate system 25. For the simplicity of description, an instance is given in which monitor region 26 is turned on the z-axis of robot coordinate system 25 by an angle of θ.

Figure 9:
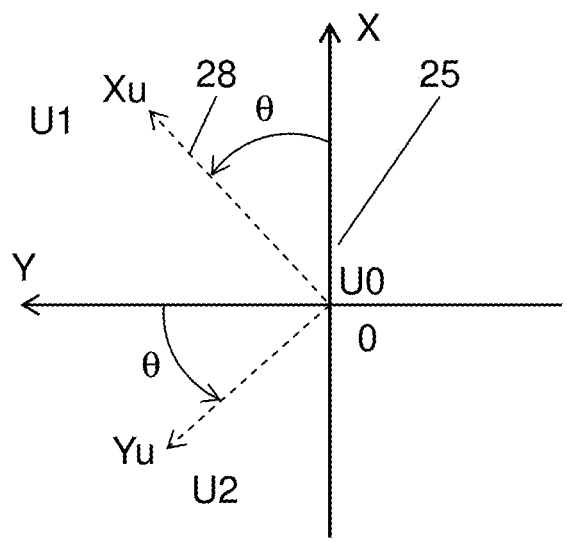
FIG. 9 is a drawing illustrating a coordinate system for a robot and a way of setting a user coordinate system.

FIG. 9 shows user coordinate system 28 (Xu, Yu, Zu) on which the turning of monitor region 26 is based. In user coordinate system 28, Zu is set such that Zu and the z-axis of robot coordinate system 25 face in an identical direction. Xu and Yu are set such that Xu and Yu are turned from x- and y-axes of robot coordinate system 25 by an angle of +θ. U0, U1, and U2 shown in FIG. 9 are definition points for user coordinate system 28.

This user coordinate system 28 is created when the user enters x, y, and z coordinates of three points in the robot coordinate system or specifies three points registered in control device 2 using operation device 3.

Figure 10:
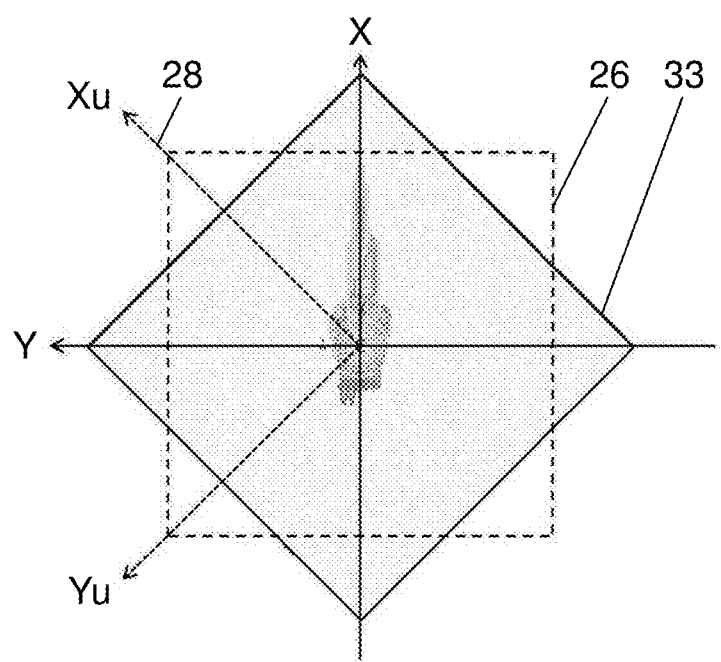
FIG. 10 is a drawing illustrating a monitor region transformed by rotation based on a user coordinate system.
Figure 11:
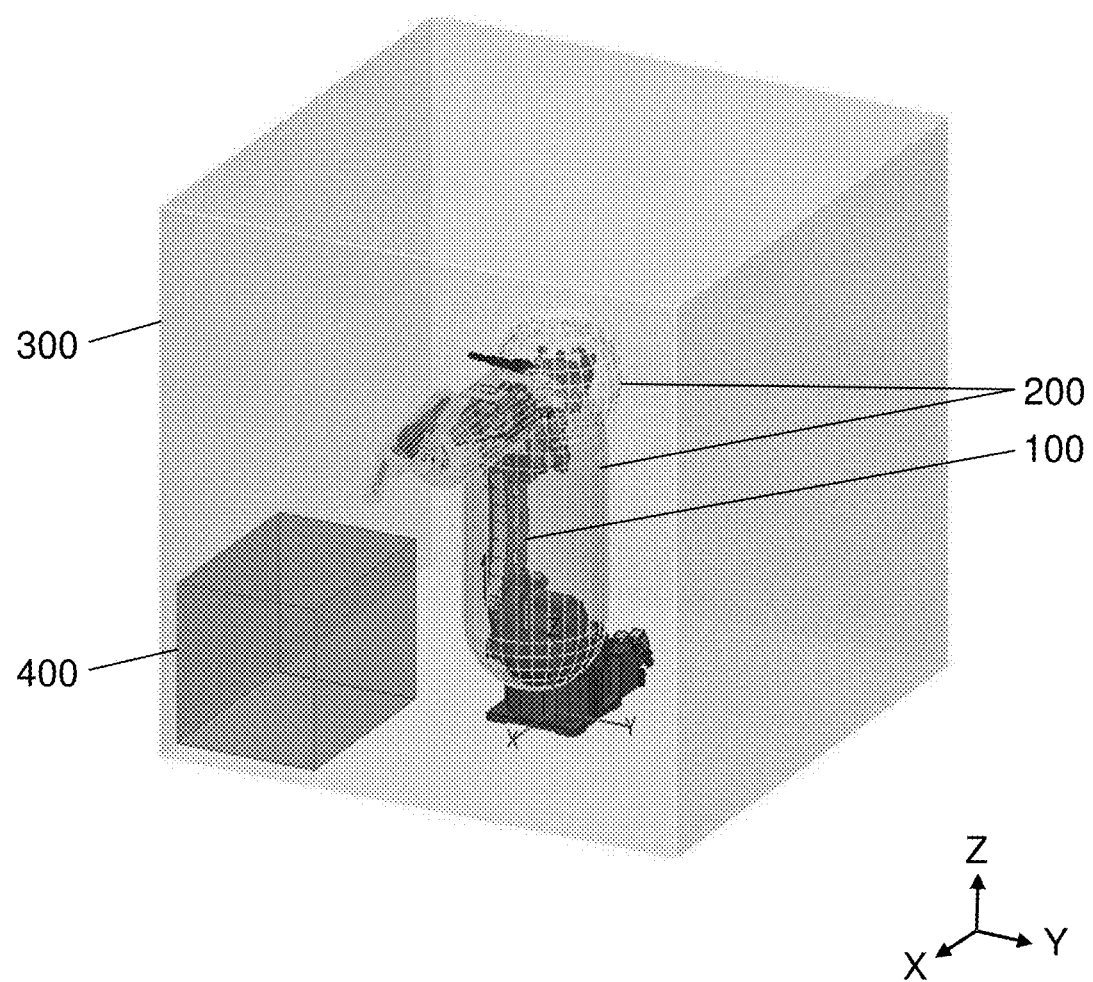
FIG. 11 is a drawing illustrating a relationship between a robot monitor model and a monitor region.

FIG. 10 shows monitor region 33 that has been transformed by rotation on the basis of user coordinate system 28 from monitor region 26 indicated with a broken line. As described above, a transformation of monitor region 26 into monitor region 33 shown in FIG. 10, however, disables use of the process of step ST6 in the flowchart of FIG. 2. This is because calculation in step ST6 is based on a premise that the monitor region is disposed parallel to the robot coordinate system.

Figure 6C:
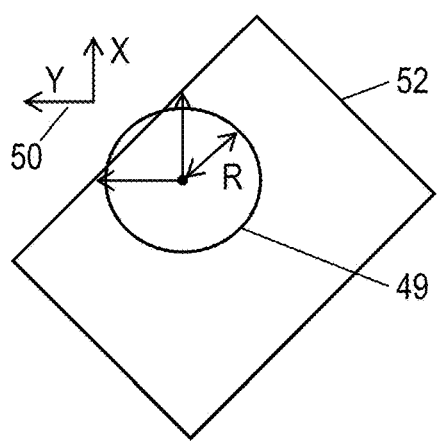
FIG. 6C is a drawing for illustrating contact between a robot monitor model and a monitor region according to the exemplary embodiment of the present invention.

As a specific example, FIG. 6C shows a relationship between monitor region 52 and spherical model 49, in which monitor region 52 has been transformed from monitor region 48 of FIG. 6A by rotation through θ about the z-axis. As illustrated in this figure, a distance from a center of spherical model 49 to a boundary surface of monitor region 48 that separates safe from unsafe is larger than radius R of the sphere in any of X and Y directions. Thus, (relationship 1) and (relationship 2), which are used to determine if spherical model 49 exists within monitor region 48, are satisfied. In spite of that, spherical model 49 is partly outside monitor region 48. If spherical model 49 is partly outside monitor region 48, the robot monitor model should be determined unsafe.

Hence, in this exemplary embodiment, the safety unit performs a calculation of (equation 5) to transform only the robot monitor model and keeps the monitor region from being transformed. This changes only the position of the robot monitor model and thus does not necessitate changing the process for determining contact in step ST6.

Figure 8B:
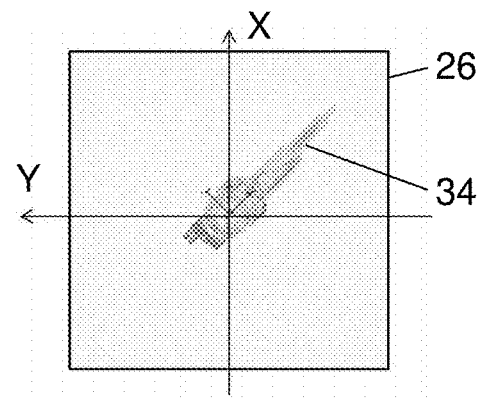
FIG. 8B is a drawing illustrating a relationship between a robot monitor model and a monitor region.

A positional relationship between the robot monitor model and the monitor region in this situation is shown by FIG. 8B. FIG. 8B shows robot monitor model 34 after a transformation in an instance where only the robot monitor model is transformed while monitor region 26 is kept from being transformed.

The positional relationship between robot monitor model 27 and monitor region 26 in FIG. 8B corresponds to the positional relationship in FIG. 10 in which the monitor region is transformed. Nevertheless, since monitor region 26 is disposed parallel to robot coordinate system 25 as illustrated in this figure, the safety unit can determine if the transformed robot monitor model is put into contact with the monitor region using the conventional calculation process as is.

If a user does not want to transform coordinates of a robot monitor model, a homogeneous transformation matrix in (equation 5) may be replaced by an identity matrix so that the coordinates of the robot monitor model are not transformed. Consequently, a transformation calculation in step ST9 can be always performed.

As described above, the procedure in this exemplary embodiment makes it possible to transform coordinates of the monitor region and hence enables use of the conventional determination process. This brings the advantage of a reduction in a number of man-hours of evaluation involved in checking operation, while product quality can be maintained.

If a determination process (step ST6) has been changed, the user is required to check if the changed determination process properly works as with the previous process. The user is also required to check if a newly added transformation calculation is properly performed. However, the method of controlling the robot in this exemplary embodiment enables the user to utilize the conventional determination process and hence eliminates the need for checking the determination process. Thus, quality can be kept at the same level as before. The method of controlling the robot in this exemplary embodiment necessitates checking only a newly added transformation calculation. This contributes to a reduction in the number of man-hours for checking operation, while product quality can be maintained.

Moreover, this method does not require a conditional branch, i.e. a choice of whether or not to perform a transformation calculation, in the process. This contributes to a further reduction in the man-hour for checking.

As described above, in the method of controlling the robot according to this exemplary embodiment, control device 2 activates robot body 1 and lets robot body 1 move, and then safety unit 11 in control device 2 executes steps ST3 to ST9 repeatedly. When safety unit 11 determines contact between the robot monitor model and the monitor region, the control device stops robot body 1 to ensure the safety of the robot system.

In this way, the method of controlling a robot according to the exemplary embodiment of the present invention involves establishing a reference coordinate system unrelated to a robot coordinate system and enabling a monitor region to move in parallel or rotationally in accordance with the reference coordinate system. This allows the monitor region to be freely disposed (turned or moved parallel) while product quality is maintained. Thus, a user can define a monitor region optimally suited for a facility of the user, and as a result, the robot system can maintain safety without excessively limiting a degree of freedom and a range in which the robot can move.

The method of controlling a robot according to the exemplary embodiment of the present invention involves establishing a coordinate system in which a user wants to define a monitor region and transforming a position of a robot monitor model viewed in the coordinate system into a position of the robot monitor model based on a robot coordinate system. This method enables the monitor region to be freely disposed without necessitating changing an existing process for determining contact between the robot monitor model and the monitor region in the robot coordinate system.

A user facility with which a user works is disposed outside a monitor region, for example. The user can transform a robot monitor model into a model based on any coordinate system, with proviso that the safety of the user facility is ensured. This enables a robot to operate even at a position where the robot has previously stopped.

In other words, the method according to the exemplary embodiment of the present invention allows a user to define a monitor region optimally suited for a facility of the user and hence enables a robot to move with minimum necessary limits. This provides increased efficiency in the use of the facility, while ensuring safety.

In the above description, safety unit 11 executes steps ST3 to ST9. However, CPU 7 in control device 2 may execute these steps.

In the above description, the robot monitor model may be defined so as to cover at least a part of robot body 1, with proviso that the robot monitor model can cover an area necessary to ensure safety of a neighborhood of the robot.

INDUSTRIAL APPLICABILITY

A robot control method according to the present invention enables a user to freely define a monitor region for a robot so that the defined region can be optimally suited for a facility. Thus, this method can be applied to a welding robot, a cutting robot, and other robots.

REFERENCE MARKS IN THE DRAWINGS

1: robot body
2: control device
3: operation device
4: motor
5: encoder
6: robot arm
7: CPU
8: RAM
9: connection cable
10: servo drive
11: safety unit
23: user coordinate system
24,25: robot coordinate system
26: monitor region
27: robot monitor model
28: user coordinate system
33: transformed monitor region
34: transformed robot monitor model
35: spherical model
36: capsule model
37: first axis position
38: second axis position
39: third axis position
40: fourth axis position
41: fifth axis position
42: sixth axis position
43,44,45: capsule model
46: incidental equipment model
47: tool model
48: monitor region
49: spherical model
50: robot coordinate system
52: transformed monitor region
100: robot
200: three-dimensional model
300: safe region
400: unsafe region

The invention claimed is:

1. A method for controlling a robot, comprising:
defining a robot monitor model that is a region covering at least a part of the robot;
defining a monitor region, within which the robot moves and which is a coordinate system parallel to a coordinate system specified by a user, in a rectangular parallelepiped shape and parallel to a coordinate system for the robot;
transforming a position of a definition point that is a point defining a spherical model or a capsule shape model of the robot monitor model into a position of the definition point in the coordinate system specified by a user;
performing a transforming calculation using the following equation:

$$^{u}P = {^{r}T_{u}}^{-1} \cdot {^{r}P} \quad \text{(equation 5)}$$

where;
${^{r}T_{u}}^{-1}$ is an inverse of the homogeneous transformation matrix used to transform a position in the robot coordinate system into a position in the user coordinate system;
determining whether the robot monitor model is put into contact with a boundary surface of the monitor region by using the transformed position of the definition point; and
stopping motion of the robot on condition that the robot monitor model is put into contact with the boundary surface.

2. A robot comprising:
a robot body; and
a control device to control the robot body,
the control device being configured to execute steps comprising:
defining a robot monitor model that is a region covering at least a part of the robot body;
defining a monitor region, within which the robot body moves and which is a coordinate system parallel to a coordinate system specified by a user, in a rectangular parallelepiped shape parallel to a coordinate system for the robot body;
transforming a position of a definition point that is a point defining a spherical model or a capsule-shape model of the robot monitor model into a position of the definition point in the coordinate system specified by a user;
performing a transforming calculation using the following equation:

$$^{u}P = {^{r}T_{u}}^{-1} \cdot {^{r}P} \quad \text{(equation 5)}$$

where;
${^{r}T_{u}}^{-1}$ is an inverse of the homogeneous transformation matrix used to transform a position in the robot coordinate system into a position in the user coordinate system;
determining whether or not the robot monitor model is put into contact with a boundary surface of the monitor region by using the transformed position of the definition point; and
stopping motion of the robot body on condition that the robot monitor model is put into contact with the boundary surface.

* * * * *